United States Patent
McClellan et al.

(10) Patent No.: US 6,904,540 B2
(45) Date of Patent: Jun. 7, 2005

(54) TARGETED DATA PROTECTION

(75) Inventors: Paul J. McClellan, Bend, OR (US); William J. Allen, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 509 days.

(21) Appl. No.: 10/002,778

(22) Filed: Oct. 29, 2001

(65) Prior Publication Data

US 2003/0088813 A1 May 8, 2003

(51) Int. Cl.⁷ .............................................. G06F 11/00
(52) U.S. Cl. .............................................. 714/6
(58) Field of Search ................................. 714/6

(56) References Cited

U.S. PATENT DOCUMENTS

| | | | |
|---|---|---|---|
| 4,993,030 A | | 2/1991 | Krakauer et al. |
| 5,097,507 A | | 3/1992 | Zinser et al. |
| 5,166,939 A | * | 11/1992 | Jaffe et al. ................. 714/766 |
| 5,247,579 A | | 9/1993 | Hardwick et al. |
| 5,467,361 A | | 11/1995 | Shipman, Jr. |
| 5,615,352 A | * | 3/1997 | Jacobson et al. ........... 711/114 |
| 5,623,598 A | * | 4/1997 | Voigt et al. ................. 714/47 |
| 5,696,934 A | * | 12/1997 | Jacobson et al. ............. 714/5 |
| 5,737,344 A | | 4/1998 | Belser et al. |
| 5,870,405 A | | 2/1999 | Hardwick et al. |
| 6,141,781 A | | 10/2000 | Mueller |
| 6,216,248 B1 | | 4/2001 | McConnell et al. |
| 6,510,527 B1 | * | 1/2003 | Woerner et al. .............. 714/5 |
| 6,571,351 B1 | * | 5/2003 | Mitaru et al. ................. 714/6 |
| 6,839,803 B1 | * | 1/2005 | Loh et al. .................. 711/113 |
| 2002/0042892 A1 | * | 4/2002 | Gold ............................. 714/6 |
| 2002/0152415 A1 | * | 10/2002 | Franklin et al. ............... 714/6 |

* cited by examiner

*Primary Examiner*—Bryce P Bonzo

(57) ABSTRACT

In accordance with the preferred embodiment of the present invention, data storage for a computing system includes a plurality of storage segments. The plurality of storage segments have different data protection levels. Data are stored in the plurality of storage segments based on data reliability requirements so that data with lower data reliability requirements are stored in a storage segment having a lower data protection level, and data with higher data reliability requirements are stored in a storage segment having a higher data protection level.

24 Claims, 5 Drawing Sheets

TARGETED DATA PROTECTION

BACKGROUND OF THE INVENTION

The present invention pertains to error detection and correction in stored data and pertains particularly to targeted data protection.

Stored data are subject to corruption through many mechanisms, such as user misuse (e.g., unintended file deletions), malicious attack (e.g. computer virus or worm attacks), system failures (e.g. magnetic tape damage by a tape drive or disk drive head crashes), and natural physical processes (e.g. cosmic ray bombardment). Various methods are employed to ensure data integrity, or more accurately, to control the probability of data corruption for storage media. These methods are typically combined to achieve a satisfactory level of data integrity.

User behavior is an important component in system data integrity. Regularly scheduled data storage backups allow falling back to a previously known, valid data state when catastrophic data corruption occurs. Also, the chance of data corruption can be reduced by installing computer virus protection systems and keeping them up to date, and by replacing storage devices when they begin to demonstrate unreliability.

Different storage media have differing physical error rates. More sensitive or important data may be stored on more reliable storage media. For example, data stored on CD-R discs are less likely to be corrupted by strong magnetic fields than are data stored on floppy discs. Some storage systems can recognize the deterioration of portions of the media and shift data automatically to more reliable locations. An example is a hard drive magnetic storage system that partitions the storage area into sectors. When the hard drive system detects that a sector is deteriorating, it marks that sector as "bad" and no longer uses it to store data.

Finally, the effective error rate for a particular storage medium can be reduced through various forms of automatic data redundancies. Redundant array of inexpensive disks (RAID) storage systems duplicate data across multiple discs to protect data against a single disc failure. Storage systems typically use error control codes (ECC) to encode stored data with extra bits to allow the systems to detect and correct for storage bit errors when reading the stored data.

Typically, storage systems are designed such that a common storage medium and error correction scheme is used for all of the data stored. An example is the magnetic storage disk drive. During the design phase, engineers decide how much storage space to dedicate to redundant information (overhead), and how much to dedicate to data. This decision is driven by anticipated corruption rates, expected characteristics of corrupted data, and customer requirements.

In certain applications (e.g., storage of compressed audio or image data), specific parts of the stored data are more sensitive to corruption than are other areas. Sensitivity, in this case, is quantified by measuring the acceptability of reproduced sound or images as judged by end users. For example, a single-bit error in one place in the compressed image data may change the intensity of a one pixel by an amount so small that the change is visually imperceptible. A single-bit error in another part of the data might severely corrupt one half of the pixels in a row of data, resulting in an unacceptable artifact.

The typical course of action, during design of the system, is to store enough redundant information so at to be able to sufficiently insulate the most sensitive portions of the data from errors. This "overprotects" the rest of the stored data, resulting in sub-optimal storage efficiency. Alternatively, the amount of redundant information might be optimized for the less sensitive portions of data, resulting in greater customer dissatisfaction.

SUMMARY OF THE INVENTION

In accordance with the preferred embodiment of the present invention, data storage for a computing system includes a plurality of storage segments. The plurality of storage segments have different data protection levels. Data are stored in the plurality of storage segments based on data reliability requirements so that data with lower data reliability requirements are stored in a storage segment having a lower data protection level, and data with higher data reliability requirements are stored in a storage segment having a higher data protection level.

DETAILED DESCRIPTION OF THE PREFERRED EMBODIMENT

Figure 1:
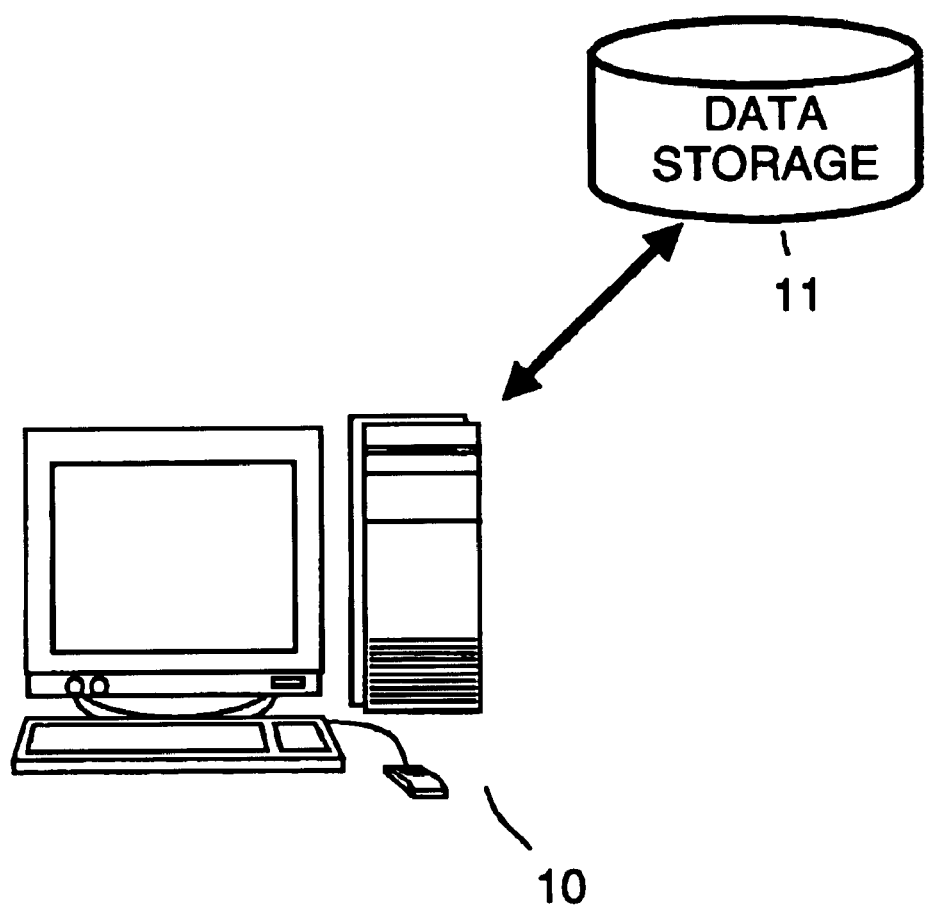
FIG. 1 is a simplified block diagram that shows a computer system that utilizes data storage.

In many domains of application a data stream consists of a sequence of fields with varying sensitivity to data errors. That is, the usability of the data stream is impacted to varying degrees according to whether one field or another suffers from errors in the data.

For example, the usability of audio data compressed according to the MPEG-1 standard (ISO/IEC 11172-3) has varying sensitivity to data errors. Part 3 of the MPEG-1 standard specifies the coded representation of audio data and provides low bit rate coding for mono or stereo audio signals. It is applicable for carrying high quality digital audio signals associated with or without picture information on storage media or transmission channels with limited capacity.

The MPEG-1 specification describes a sequence of encoding, storage and decoding of audio data. The encoder processes the digital audio signal and produces the compressed bitstream for storage. The encoder algorithm is not standardized, and may use various means for encoding such as estimation of the auditory masking threshold, quantization, and scaling. However, the encoder output must be such that a decoder conforming to the MPEG-1 standard will produce audio suitable for the intended application.

Input audio samples are fed into the encoder. The mapping creates a filtered and subsampled representation of the input audio stream. The mapped samples may be called either subband samples (as in Layer I) or transformed subband samples (as in Layer III). A psychoacoustic model creates a set of data to control the quantizer and coding. These data are different depending on the actual coder implementation. One possibility is to use an estimation of the masking threshold to do this quantizer control. The quantizer and coding block creates a set of coding symbols from the mapped input samples. Again, this block can depend on the encoding system. The block 'frame packing' assembles the actual bitstream from the output data of the other blocks, and adds other information (e.g. error correction) if necessary.

Depending on the application, different layers of the coding system with increasing encoder complexity and performance can be used. An ISO MPEG Audio Layer N decoder is able to decode bitstream data which have been encoded in Layer N and all layers below N.

Layer I contains the basic mapping of the digital audio input into 32 subbands, fixed segmentation to format the data into blocks, a psychoacoustic model to determine the adaptive bit allocation, and quantization using block companding and formatting. Layer II provides additional coding of bit allocation, scale factors and samples. Different framing is used.

Layer III introduces increased frequency resolution based on a hybrid filter bank. It adds a different (nonuniform) quantizer, adaptive segmentation and entropy coding of the quantized values.

Access to storage may involve remote access over a communication system. Access is assumed to be controlled by a functional unit other than the audio decoder itself. This control unit accepts user commands, reads and interprets data base structure information, reads the stored information from the media, demultiplexes non-audio information and passes the stored audio bitstream to the audio decoder at the required rate.

The decoder accepts the compressed audio bitstream, decodes the data elements, and uses the information to produce digital audio output.

Bitstream data are fed into the decoder. The bitstream unpacking and decoding block does error detection if error-check is applied in the encoder. The bitstream data are unpacked to recover the various pieces of information. The reconstruction block reconstructs the quantized version of the set of mapped samples. The inverse mapping transforms these mapped samples back into uniform pulse-code modulated (PCM) audio data.

Annex E of the MPEG-1 specification characterizes the sensitivity of individual bits of the encoded data to random errors.

The sensitivity of individual bits to random errors is given for each bit by a value from 0 to 5, indicating the amount of degradation resulting from one isolated error, as set out in Table 1 below:

TABLE 1

| Level | Amount of Degradation |
|-------|----------------------|
| 5 | catastrophic |
| 4 | very annoying |
| 3 | annoying |
| 2 | slightly annoying |
| 1 | audible |
| 0 | insensitive |

The values are not the results of precise measurements, rather they rely upon knowledge of the MPEG-1 encoding/decoding process. They assume an application-specific error detection scheme is not in use.

Table 2 and Table 3 below summarize the encoded data bit sensitivities for MPEG-1 Part 3 compressed audio data. Some fields in the bit stream do not have a fixed length. All bits in these fields are rated for error sensitivity, even if not in use.

TABLE 2

MPEG-1 Part 3, Layers I and II

| Parameters | #bit | sensitivity |
|------------|------|-------------|
| Header Information | all bits | 5 |
| Bit allocation | all bits | 5 |
| Scalefactors select information | all bits | 5 |
| Scalefactors | 5 (msb) | 4 |
| | 4 | 4 |
| | 3 | 4 |
| | 2 | 3 |
| | 1 | 2 |
| | 0 (lsb) | 1 |
| Subband samples (*) | 8–16 (msb) | 3 |
| | 5–7 | 2 |
| | 3, 4 | 1 |
| | (lsb) 0–2 | 0 |

(*) according to the bit allocation

TABLE 3

MPEG-1 Part 3, Layer III

| Parameters | #bit | sensitivity |
|------------|------|-------------|
| Header Information | all bits | 5 |
| Scf_si | all bits | 5 |
| Part2/3_length | all bits | 4 |
| Big_values | all bits | 3 |
| Global_gain | all bits | 5 |
| Scalefactor_select | all bits | 5 |
| Blocksplit_flag | all bits | 5 |
| Block_type | all bits | 4 |
| Switch_frequency | all bits | 4 |
| Table_select | all bits | 5 |
| Region_adress1 | all bits | 3 |
| Region_adress2 | all bits | 3 |
| extension_bits (if present) | all bits | 0 |
| Preflag | 0 | 2 |
| Scalefac_scale | 0 | 2 |
| Count1 table_select | 0 | 3 |
| Subblock_gain | 2 (msb) | 4 |
| | 1 | 3 |
| | 0 (lsb) | 2 |
| Scalefac (**) | 3 (msb) | 3 (2) |
| | 2 | 3 (2) |
| | 1 | 2 (1) |
| | 0 (lsb) | 2 (1) |
| Huffman codes (***) | 0...n−1 | 3–0 |

(**) the scalefac length depends on scalefac_select. The bit sensitivity values refer to the scalefac_scale value 1 (if 0 the value is in parenthesis).
(***) If n is the number of bits for Huffman coding in one block the bit sensivity decreases linearly from 3 to 0 as the bit number varies from 0 up to n, (from low to high frequency).

Table 2 and Table 3 above illustrate that a data bit stream may have varying sensitivities to bit errors, and that this sensitivity information may be known a priori to storing the data. This sensitivity information can be provided with the data, itself, to a storage system to achieve an optimal balance of data integrity (system quality) versus cost.

In the preferred embodiments of the present invention, storage efficiency can be increased while still achieving system performance that meets customer needs by taking into account the variance of the sensitivity to bit errors of distinct portions of the data when these sensitivities can be characterized.

FIG. 1 shows a computer system 10 that utilizes data storage 11. Data storage 11 can be internal to computer system 10 or external to computer system 10. Data storage 11 can be a single hard disk, an array of hard disks, compact disk (CD) storage, tape storage or any other type of data storage.

Figure 2:
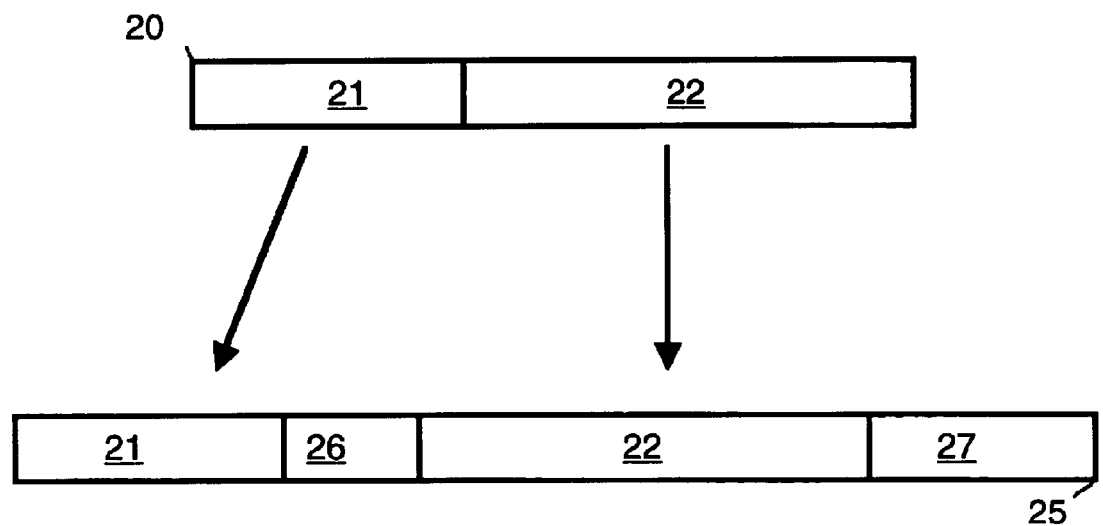
FIG. 2 illustrates redundant information being stored with data to be used for error correction and detection.

Typically, data storage 11 includes redundant information used for data correction and detection. For example, FIG. 2 shows data 20 to be stored. Data 20 includes data portion 21 and data portion 22. Data portion 21 is highly sensitive to bit errors. Data portion 22 is less sensitive to bit errors. When stored within data storage 11, redundant information 26 is stored with data portion 21. Redundant information 26 is 50 percent of the size of data portion 21 giving significant error protection. Redundant information 27 is stored with data portion 22. Redundant information 27 is 50 percent of the size of data portion 22 giving significant error protection. While data portion 21 "requires" this significant error protection, such a high level of error protection is not necessary for data portion 22.

The scheme illustrated by FIG. 2 does not take advantage of the fact that, in some cases, sensitivity to bit errors varies as a function of position in the sequence of data to be stored. The result is a forced tradeoff between reduced customer satisfaction and reduced storage efficiency.

In the preferred embodiment of the present invention, the storage system adapts the level of data protection to the sensitivity of the data to errors. More sensitive or important data are stored at a higher level of data protection. Less sensitive or important data are stored at a lower level of data protection.

Figure 3:
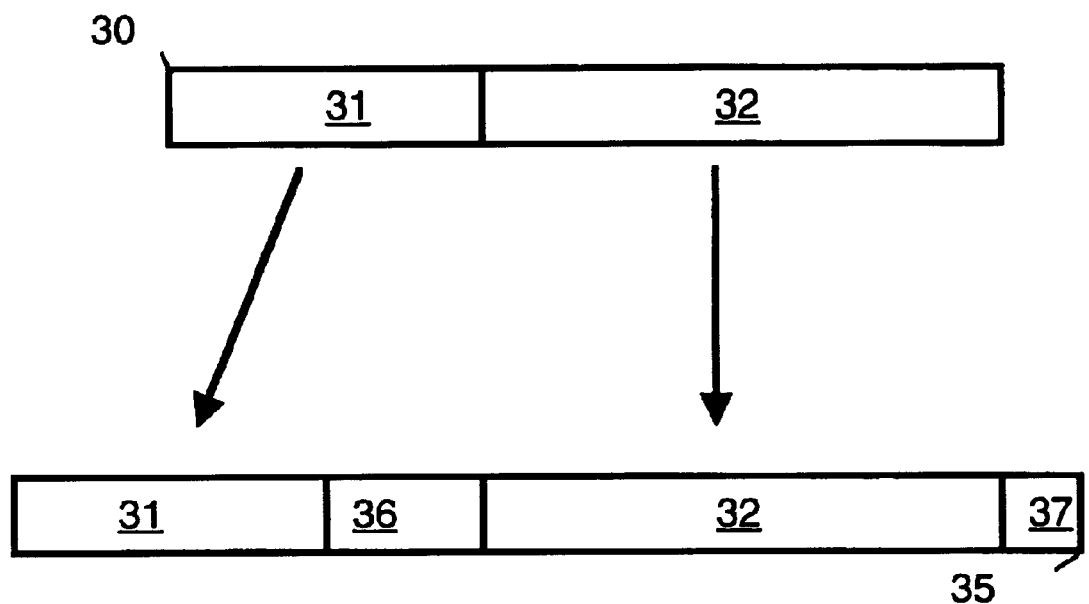
FIG. 3 illustrates various levels of error protection being provided by varying the redundant information stored with data portions in accordance with a preferred embodiment of the present invention.

FIG. 3 illustrates how system quality can be achieved with lower storage requirements. In FIG. 3 redundant information is shown for illustrative purposes as contiguous bits stored with the data portions; however, it is not required to store the redundant information in any particular location.

FIG. 3 shows data 30 to be stored. Data 30 include data portion 31 and data portion 32. Data portion 31 is highly sensitive to bit errors. Data portion 32 is less sensitive to bit errors. When stored within data storage 11, redundant information 36 is stored with data portion 31. Redundant information 36 is 50 percent of the size of data portion 31 giving significant error protection. Redundant information 37 is stored with data portion 32. Redundant information 37 is 15 percent of the size of data portion 32 giving less error protection. Data portion 31 is thus given significant error protection while data portion 32 is given less error protection. While redundant information 37 gives less protection than redundant information 36, redundant information 37 still gives sufficient protection to meet the needs of the particular application.

FIG. 3 illustrates various levels of error protection being provided by varying the redundant information stored with a data portion. However, the level of error protection can be varied in a number of different ways. For example, in the preferred embodiments of the present invention, a storage system can implement varying levels of data protection through multiple storage media types, explicit data redundancy, and/or varying levels of error control codes (ECC). Higher data protection is achieved by using a more reliable storage medium, by explicitly duplicating data, and/or with greater ECC overhead. Lower data protection is achieved by using a less reliable storage medium, by not duplicating data, and/or with less ECC overhead. More reliable storage media areas and less reliable storage media areas may occur on different parts of the same physical medium. For example, on a disk drive the probability of error may be greater for bits stored near the perimeter of a disk. This results in different reliability characteristics (probability of a bit error) depending on storage location on the disk drive.

In a preferred embodiment of the present invention, data storage 11 is segmented into data protection levels. The number of data protection level segments can be fixed or may vary, for example, according to the domain of application.

For example, data storage 11 is segmented into six levels according to the amount of semantic degradation resulting from uncorrected data bit errors. The six levels are set out in Table 4 below:

TABLE 4

| Level | Resulting Semantic Degradation |
| --- | --- |
| Level 5 | catastrophic |
| Level 4 | very annoying |
| Level 3 | annoying |
| Level 2 | slightly annoying |
| Level 1 | barely perceptible |
| Level 0 | imperceptible |

Assignment of data to these levels may be the result of careful perceptual measurements or may rely upon knowledge of the data format and perceptual sensitivities of the application user.

Figure 4:
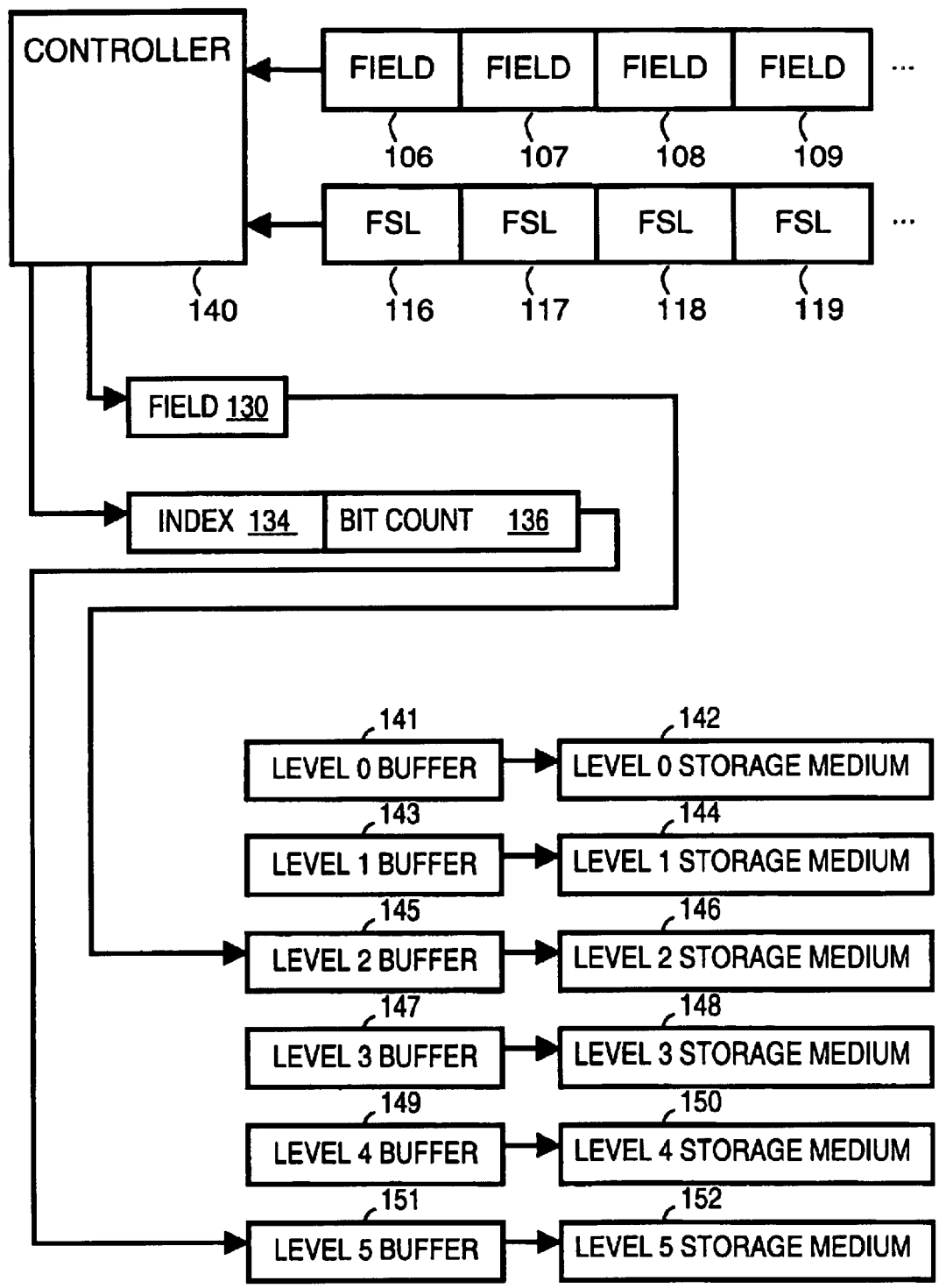
FIG. 4 illustrates storage of data in different storage media segments that provide differing levels of error protection in accordance with a preferred embodiment of the present invention.

FIG. 4 illustrates storing data within data storage 11. When storing data, data storage 11 requires sensitivity information along with the data to be stored. This information identifies how the data should be segmented and stored into the various storage segments to achieve an optimal balance of data integrity (e.g., system quality) versus cost (e.g., storage space use). This information may need to be explicitly provided with the data, or may be implied by the domain of application. A description of how the data were actually segmented is stored with data at the highest level of data protection.

When retrieving the stored data, the stored segmentation information is retrieved to control the reassembly of the original data from the storage segments. This allows the storage system to reassemble data without needing external sensitivity information.

For some domains of application, the data may have such fixed structure that the actual data segmentation is implied and this information need not be stored with the data in the system.

In FIG. 4, data are stored with associated segmentation information in multiple storage segments. A data bit stream includes a field 106, a field 107, a field 108 and a field 109. Other fields (not shown) also are typically included within the data bit stream. With each field within data bit stream there is associated sensitivity information in the form of an integer indicating a field sensitivity level (FSL). For example, FSL 116 indicates the sensitivity for the data within field 106. FSL 117 indicates the sensitivity for the data within field 107. FSL 118 indicates the sensitivity for the data within field 108. FSL 119 indicates the sensitivity for the data within field 109.

A controller 140 within data storage 11 and/or computer system 10 is used to store each field that it reads from the data bit stream into the appropriate storage segment within data storage 11. Controller 140 logically maps a file to a set of storage segment addresses, one address for each storage segment. These segment addresses indicate the starting logical address at which data are stored for each segment for that file.

FIG. 4 shows six levels of storage media. Each storage medium utilizes a buffer to buffer data transferred to and from the storage media. Specifically, a level 0 buffer 141 is used to buffer data transferred to and from level 0 storage medium 142. A level 1 buffer 143 is used to buffer data transferred to and from level 1 storage medium 144. A level 2 buffer 145 is used to buffer data transferred to and from level 2 storage medium 146. A level 3 buffer 147 is used to buffer data transferred to and from level 3 storage medium 148. A level 4 buffer 149 is used to buffer data transferred to and from level 4 storage medium 150. A level 5 buffer 151 is used to buffer data transferred to and from level 5 storage medium 152.

Each buffer accumulates data bits sent to the associated storage media by controller 140. The buffer is flushed to the storage medium at the current segment address according to methods well understood in the current art to optimize storage system performance. FIG. 4 shows a particularly buffering scheme. As will be understood by persons of ordinary skill in the art, other buffering schemes may be used. For example, a single buffer can be used for all levels of storage media.

The storage medium for each level can be physically unique. For example, level 4 medium 150 is a hard disk drive, while level 3 storage medium 148 is non-volatile solid state memory.

Alternatively, all the storage media may share a same physical device, but be logically separated. For example, all six levels of storage media resides on a single disk drive, with each level's data having a different amount of error correcting information stored with them. This embodiment is illustrated by FIG. 3 where there are two levels of storage on the same physical medium. One level, however, has a relatively larger number of ECC bits allocated to it.

Before storing a data bit stream field 130 into a storage segment, controller 140 stores a segmentation datum describing that field assignment into a highest protection level storage segment (i.e., level 5 storage medium 152). The segmentation datum consists of a storage segment index 134 and a bit count 136. For some domains of application, the segmentation datum may be implied by the application. In this case it is unnecessary for controller 140 to store segmentation datum.

During the process of writing the data into the storage medium, appropriate ECC bits are added. These bits are used when the data are retrieved in order to detect and correct bit errors that may have occurred during writing or storage.

The amount of storage allocated to ECC bits (overhead) is not fixed, but is determined by the user requirements (sensitivity to corruption) and the probability of errors occurring in data stored in each media segment. Using a variable amount of protection allows a designer of a storage system to better optimize performance of the system, relative to use requirements, by more efficiently using the resources of various storage media and the amount of ECC overhead used for media sections of the data having differing sensitivities to errors.

Figure 5:
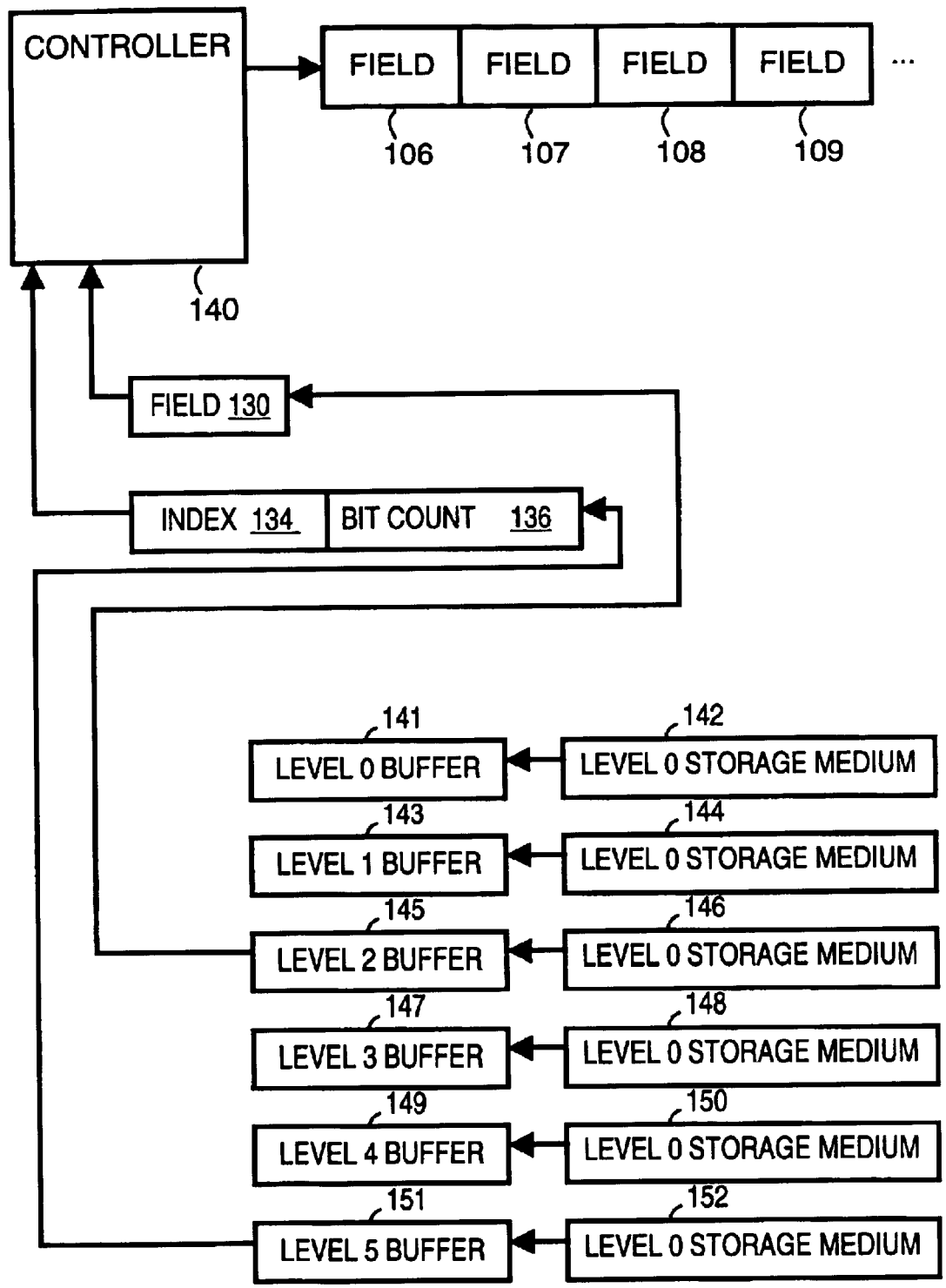
FIG. 5 illustrates retrieval of data from different storage media segments that provide differing levels of error protection in accordance with a preferred embodiment of the present invention.

FIG. 5 illustrates retrieving data from the storage media. Controller 140 reconstructs the data bit stream consisting of a sequence of data bit stream fields, illustrated in FIG. 5 by field 106, field 106, field 107, field 108 and field 109. The sequence of data bit stream fields are retrieved from the various levels of storage media. For each data bit stream field 130, controller 140 reads the segmentation datum from the highest protection level storage segment (level 5 storage medium 152). The segmentation datum consists of storage segment index 134 and bit count 136. Controller 140 then reads the specified number of bits from the specified segment to construct the field 130. For some domains of application the segmentation datum may be implied by the application and the segmentation datum not actually stored in the storage segment.

The buffer for each storage medium level stores data bits read from the segment's storage medium so as to be readily available for access by controller 140.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computing system comprising:

data storage, the data storage including:
a single hard disk having a plurality of storage segments, the storage segments having different data protection levels;

wherein data are stored in the plurality of storage segments based on data reliability requirements so that data with lower data reliability requirements are stored in a storage segment having a lower data protection level, and data with higher data reliability requirements are stored in a storage segment having a higher data protection level;

wherein within every storage segment redundant data is stored; and, wherein different data protection levels are achieved using varying percentages of redundant data being stored with the data.

2. A computing system as in claim 1 wherein data reliability requirements for the data are determined based on resulting semantic degradation resulting from errors in the data.

3. A computing system as in claim 1 wherein different data protection levels use different storage areas within a single storage medium.

4. A computing system as in claim 1 wherein different data protection levels are additionally achieved using different types of storage media.

5. A computing system as in claim 1 wherein for each data field a segmentation datum is stored indicating in which data segment the data field is stored.

6. A computing system as in claim 1 wherein for each data field to be stored, an associated field sensitivity level indicates data reliability requirements for the data field.

7. A computing system comprising:

data storage, the data storage including:
a plurality of storage segments, the storage segments having different data protection levels;

wherein data are stored in the plurality of storage segments based on data reliability requirements so that data with lower data reliability requirements are stored in a storage segment having a lower data protection level, and data with higher data reliability requirements are stored in a storage segment having a higher data protection level; and, wherein different data protection levels are achieved by implementing storage segments with different data protection levels using different types of storage media.

8. A computing system comprising:
  data storage, the data storage including:
    a plurality of storage segments, the storage segments having different data protection levels;
  wherein data are stored in the plurality of storage segments based on data reliability requirements so that data with lower data reliability requirements are stored in a storage segment having a lower data protection level, and data with higher data reliability requirements are stored in a storage segment having a higher data protection level; and,
  wherein for each data field a segmentation datum is stored indicating in which data segment the data field is stored, the segmentation datum including:
    a storage segment index; and,
    a bit count.

9. A data storage system, the storage system comprising:
  a single hard disk having a plurality of storage segments, the storage segments having different data protection levels; and,
  a controller, the controller storing data in the plurality of storage segments based on data reliability requirements so that data with lower data reliability requirements are stored in a storage segment having a lower data protection level, and data with higher data reliability requirements are stored in a storage segment having a higher data protection level;
  wherein within every storage segment redundant data is stored; and,
  wherein different data protection levels are achieved using varying percentages of redundant data being stored with the data.

10. A data storage system as in claim 9 wherein data reliability requirements for the data are determined based on resulting semantic degradation resulting from errors in the data.

11. A data storage system as in claim 9 wherein different data protection levels use different types of storage media.

12. A data storage system in claim 9 wherein different data protection levels are additionally achieved using different types of storage media.

13. A data storage system as in claim 9 wherein for each data field a segmentation datum is stored indicating in which data segment the data field is stored.

14. A data storage system as in claim 9 wherein for each data field to be stored, an associated field sensitivity level indicates data reliability requirements for the data field.

15. A data storage system comprising:
  a plurality of storage segments, the storage segments having different data protection levels; and,
  a controller, the controller storing data in the plurality of storage segments based on data reliability requirements so that data with lower data reliability requirements are stored in a storage segment having a lower data protection level, and data with higher data reliability requirements are stored in a storage segment having a higher data protection level;
  wherein different data protection levels are achieved using different types of storage media.

16. A data storage system comprising:
  a plurality of storage segments, the storage segments having different data protection levels; and,
  a controller, the controller storing data in the plurality of storage segments based on data reliability requirements so that data with lower data reliability requirements are stored in a storage segment having a lower data protection level, and data with higher data reliability requirements are stored in a storage segment having a higher data protection level;
  wherein for each data field a segmentation datum is stored indicating in which data segment the data field is stored, the segmentation datum including:
    a storage segment index; and,
    a bit count.

17. A method for storing data comprising the following step:
  (a) storing the data in a single hard disk that has a plurality of storage segments, the storage segments having different data protection levels, including the following substep:
    (a.1) storing the data in the plurality of storage segments based on data reliability requirements so that data with lower data reliability requirements are stored in a storage segment having a lower data protection level, and data with higher data reliability requirements are stored in a storage segment having a higher data protection level, wherein within every storage segment redundant data is stored, and wherein different data protection levels are achieved using varying percentages of redundant data being stored with the data.

18. A method as in claim 17 wherein in substep (a.1) data reliability requirements for the data are determined based on resulting semantic degradation resulting from errors in the data.

19. A method as in claim 17 wherein in substep (a.1) different data protection levels use different storage areas within a single storage medium.

20. A method as in claim 17 wherein in step (a) different data protection levels are additionally achieved using different types of storage media.

21. A method as in claim 17 wherein step (a) additionally comprises the following substep:
  (a.2) storing a segmentation datum for each data field, the segmentation datum indicating in which data segment the data field is stored.

22. A method as in claim 17 wherein in step (a) for each data field to be stored, an associated field sensitivity level indicates data reliability requirements for the data field.

23. A method for storing data comprising the following:
  storing the data in a plurality of storage segments, the storage segments having different data protection levels, including the following:
    storing the data in the plurality of storage segments based on data reliability requirements so that data with lower data reliability requirements are stored in a storage segment having a lower data protection level, and data with higher data reliability requirements are stored in a storage segment having a higher data protection level; wherein different data protection levels are achieved by implementing storage segments with different data protection levels using different types of storage media.

24. A method for storing data comprising the following:
  storing the data in a plurality of storage segments, the storage segments having different data protection levels, including the following:
    storing the data in the plurality of storage segments based on data reliability requirements so that data with lower data reliability requirements are stored in a storage segment having a lower data protection level, and data with higher data reliability requirements are stored in a storage segment having a higher data protection level, and
    storing a segmentation datum for each data field, the segmentation datum indicating in which data segment the data field is stored, the segmentation datum including a storage segment index, and a bit count.

* * * * *